United States Patent
Core (10) Patent No.: US 6,636,595 B1
(45) Date of Patent: Oct. 21, 2003

(54) NON-KSU MESSAGE DELIVERY SYSTEM

(75) Inventor: Kenneth R. Core, Stanton, CA (US)

(73) Assignee: Casio Communications, Inc., Torrance, CA (US)

( * ) Notice: Subject to any disclaimer, the term of this patent is extended or adjusted under 35 U.S.C. 154(b) by 0 days.

(21) Appl. No.: 09/476,543

(22) Filed: Jan. 3, 2000

Related U.S. Application Data (60) Provisional application No. 60/114,612, filed on Jan. 4, 1999.

(51) Int. Cl.[7] .............................. H04M 1/00; H04Q 5/20
(52) U.S. Cl. ..................... 379/201.1; 379/156; 379/159
(58) Field of Search ................................ 379/201, 156, 379/157, 159, 164; 370/522

(56) References Cited

U.S. PATENT DOCUMENTS

| | | | | |
|---|---|---|---|---|
| 4,631,367 A | * | 12/1986 | Coviello et al. | ............ 379/157 |
| 5,596,631 A | * | 1/1997 | Chen | ........................... 379/157 |

* cited by examiner

Primary Examiner—William J. Deane, Jr.
(74) Attorney, Agent, or Firm—Frishauf, Holtz, Goodman & Chick, P.C.

(57) ABSTRACT

A non-KSU message delivery system enables any station within the non-KSU system to automatically answer incoming calls and prevents more than one station from automatically answering the incoming calls. The non-KSU system allows for distributed recording of voice messages and allows transferred calls to be answered by a specific station's voice mail. The non-KSU system also stores an incoming caller's calling party identification information at a station if the incoming call is either manually or automatically answered by the particular station.

13 Claims, 4 Drawing Sheets

NON-KSU MESSAGE DELIVERY SYSTEM

CROSS REFERENCE TO RELATED APPLICATIONS

The present application claims priority under 35 USC 119 of U.S. Provisional Application No. 60/114,612 filed Jan. 4, 1999, the entire disclosure of which is incorporated hereby by reference.

BACKGROUND OF THE INVENTION

1. Field of the Invention

The present invention relates to a non-KSU ("key service unit") telephone apparatus, and more particularly to a non-KSU telephone apparatus and its method of operation within a non-KSU telephone system, which includes message recording in response to a transferred call, distributed message taking, and distribution and storage of CPID (calling party identification) information.

2. Background Information

Often small businesses and home offices that have multiple telephone lines simply connect individual telephone units and corresponding extensions to separate telephone lines. Generally, these consumers would find it advantageous to have the appearance of a larger organization. If the small business/home office experiences an increased volume of telephone traffic, one way of handling the increased volume is to upgrade the telephone system. Unfortunately, a telephone system such as a PBX system would be an impractical solution since avoiding major capital investments and service costs are important considerations for a small business/home office. A key telephone system obviates the need for a PBX system and attendant switchboard operators, since each telephone in the system is connected by a cable to a central control box referred to as a "key service unit" (KSU). However, the necessity of special cabling complicates installation and creates difficult service problems should a break develop in one or more of the cables, or if the KSU itself should fail.

A distributed telephone system (one that does not require a central control box, e.g. no KSU required) which provides subscribers with system-wide features such as intercom and call transferring are known as "non-KSU" or "KSU-less" systems. These non-KSU systems are capable of significantly enhancing business efficiency and customer service in a cost-effective manner. However, the non-KSU systems do not include features that are found in KSU systems. For example, while call-transferring permits a person located at one station to manually transfer an incoming call to a person at a second station, traditional non-KSU systems are not able to transfer the incoming call from the first station and allow the incoming caller to record a message into a voice mailbox at the second station. In addition, non-KSU systems are not known to be able to be automatically answered (without human intervention) at one station and then allow the incoming caller to direct the call to a particular station within the system.

Furthermore, non-KSU systems are not known to have a decentralized answering system such that each station has its own telephone answering device. Generally, the cost of a centralized voice mail system varies depending on the number of stations the voice mail system is capable of handling. That is, a centralized voice mail system capable of handling 12 stations is generally more expensive than a centralized voice mail system only capable of handling three stations. Therefore, if the user only requires 2–3 stations as he is starting out, but he purchased a system capable of handling 12 stations, the cost of voice mail for these two or three stations would be accordingly more expensive. In addition, in centralized voice mail systems, users retrieve their messages by physically going to or dialing into a central station. It would be advantageous to have a non-KSU system with a distributed voice mail system in which each station is equipped with voice mail capabilities. Since the cost per station of a distributed voice mail system would remain constant, a user could start off with a small system and expand his telephone system as necessary. In addition, the user would have the ability to retrieve voice mail intended for a particular station, directly at that station without having to dial into a central station. Due to the lack of a distributed voice mail system, non-KSU systems are not known to associate calling party identification (CPID) information with their respective voice messages at the station to which the incoming call has been transferred.

There is also a need for a logical scheme for distributing and storing calling party identification (CPID) information. Generally all stations within a non-KSU system have access to all of the telephone lines. If the non-KSU system is capable of handling CPID information, every station would receive whatever CPID information is transmitted over every telephone line. In a known system, there are two settings which determine how CPID information is stored. Each station is set to either 1) store all the CPID information received over the connected telephone lines, regardless of whether it was intended for that station; or 2) only store the CPID information if the call is manually answered at that station. If the station is set for the second option and no one is there to answer the call, the CPID information is lost. It would be advantageous for CPID information to be stored at a directed station even if no one is there to answer the call at that moment. The first option provided by Nortel, whereby a station stores CPID information for every incoming call, would create information overload, thereby rendering the system extremely inefficient.

OBJECTS AND SUMMARY OF THE INVENTION

It is therefore an object of the present invention to provide an enhanced, cost-effective, and expandable non-KSU system.

It is another object of the present invention to provide a non-KSU system in which any station within the non-KSU system may be chosen to automatically answer incoming calls.

It is a further object of the present invention to provide a non-KSU system which prevents more than one station from automatically answering incoming calls.

It is yet another object of the present invention to provide a non-KSU system that allows for distributed recording of voice messages.

It is yet a further object of the present invention to provide a non-KSU system that allows transferred calls to be answered by a station's voice mail.

It is still another object of the present invention to provide a non-KSU system in which the cost per station of having voice mail remains constant.

It is still a further object of the present invention to provide a non-KSU system that stores an incoming call's calling party identification (CPID) information at a station if the incoming call is manually or automatically answered by that station.

It is still yet another object of the present invention to provide a non-KSU system that associates an incoming call's CPID information with the respective voice message following the transfer of the incoming call to a destination station.

It is still yet a further object of the present invention to provide an apparatus that operates within a non-KSU system such that the apparatus may be selectively chosen to automatically answer incoming calls.

It is another object of the present invention to provide an apparatus that operates within a non-KSU system such that the apparatus has an integrated telephone answering machine.

It is further object of the present invention to provide an apparatus that operates within a non-KSU system such that the apparatus' telephone answering device functionality is activated by signals other than central office (CO) ring signals.

In accordance with one form of the present invention, a non-key service unit (non-KSU) telephone apparatus for use with a plurality of telephones includes a line interface having an input operatively coupled to the plurality of telephone lines. The line interface also includes a plurality of outputs.

The non-KSU also includes a microcontroller operatively coupled to the line interface, a first multiplexer operatively coupled to the microcontroller and at least a portion of the plurality of outputs of the line interface, wherein the first multiplexer multiplexes transmit and receive audio signals for the plurality of telephone lines. The non-KSU also includes a coder/decoder coupled to the first multiplexer wherein the microcontroller instructs the first multiplexer to couple one of the plurality of telephone lines to the coder/decoder. The coder/decoder receives a telephone signal from one of the telephone lines, filters and compresses the telephone signal, and converts the filtered compressed telephone signal to a digital signal. The non-KSU also includes a digital signal processor operatively coupled to the coder/decoder and the microcontroller. The digital signal processor analyses the digital signal provided by the coder/decoder and determines whether the digital signal is a speech signal or DTMF tones. If the digital signal processor determines that the digital signal is DTMF tones, the digital signal processor decodes the DTMF tones and provides the decoded DTMF tones to the microcontroller, and if the digital signal processor determines that the digital signal is a speech signal, the digital signal processor compresses the digital signal and stores the compressed digital signal in a memory.

In accordance with another form of the present invention, a message transfer method for a telephone signal having a plurality of telephone lines and a plurality of telephone stations, one of which is designated as an audio-attendant station, includes the steps of:

receiving an incoming call from a caller on a first telephone line;

detecting a ring signal over the first telephone line at the telephone station that was designated to function as the auto-attendant station;

seizing the first telephone line via the auto-attendant station;

playing an outgoing message via the auto-attendant station on the first telephone line;

monitoring a response to the outgoing message by a caller on the first telephone line, the response corresponding to a desired one of the plurality of telephone stations that the caller would like the incoming call transferred to;

directing the incoming call via the auto-attendant station to a desired one of the plurality of telephone stations in accordance with the caller's response;

encoding digital data which includes instructions on handling the incoming telephone call;

transmitting the digital data as a digital bit stream;

modulating the digital bit stream onto a telephone line shared commonly between at least the auto-attendant station and the desired telephone station, the digital bit stream containing information to specifically notify the desired one of the plurality of telephone stations to prepare to receive a transferred call and on which telephone line of the plurality of telephone lines the incoming call resides;

demodulating the modulated digital bit stream at the desired one of the plurality of telephone stations;

decoding the demodulated digital bit stream; and generating a specific ring signal at the desired telephone station to indicate that a call is being transferred, wherein if the transferred call is manually answered, the desired telephone station seizes the telephone line on which the transferred call resides, and wherein in response to a drop in DC voltage when the desired telephone station seizes the telephone line, placing the auto-attendant station in an on-hook mode.

These and other objects, embodiments, features and advantages of this invention will be apparent from the following detailed description of illustrative embodiments thereof, which is to be read in connection with the accompanying drawings.

DETAILED DESCRIPTION OF THE PREFERRED EMBODIMENTS

Figure 1:
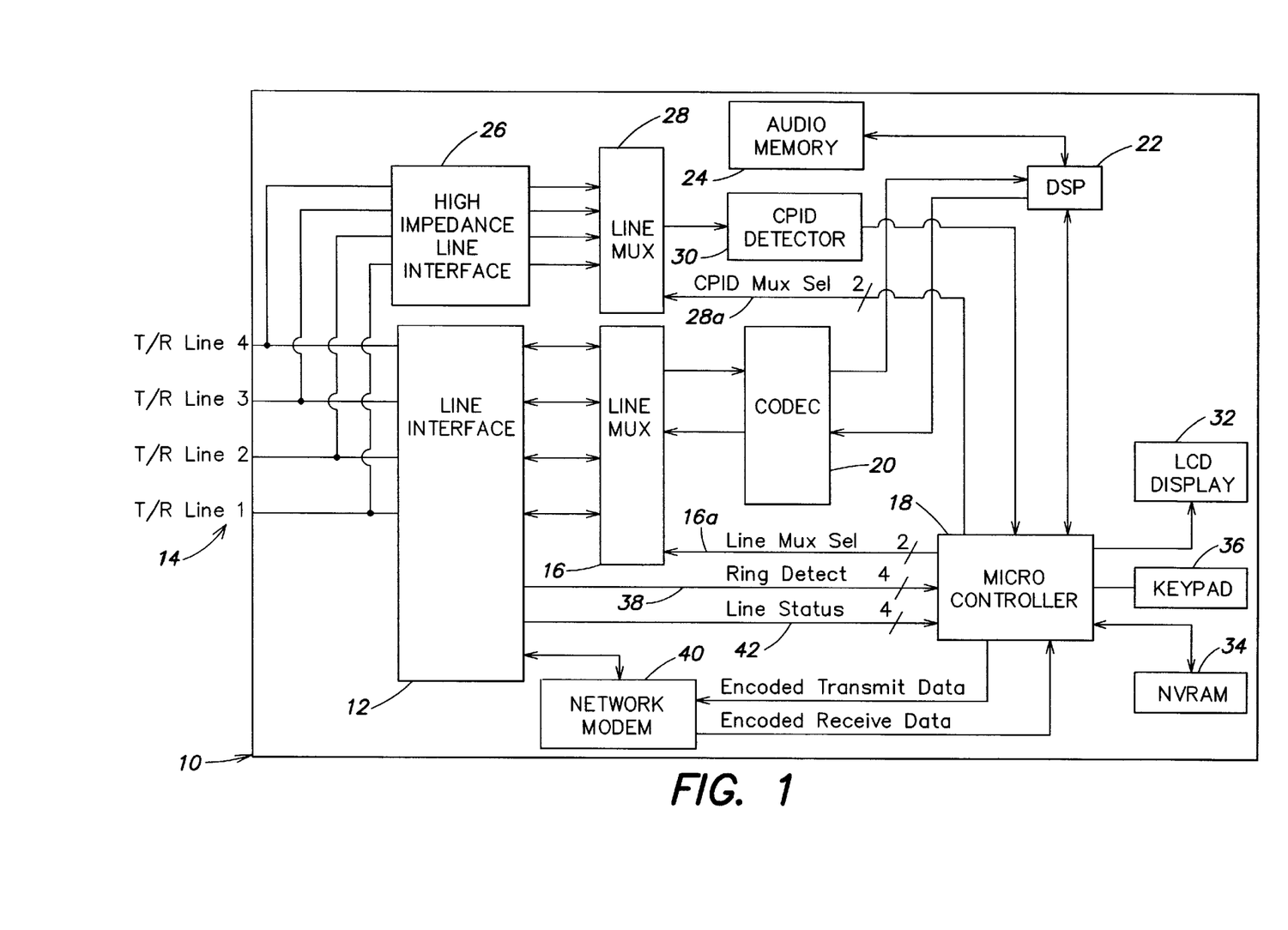
FIG. 1 is a block diagram of a telephone station in accordance with an embodiment of the present invention.

Referring initially to FIG. 1, a block diagram of a station 10 in accordance with a preferred embodiment of the present invention is shown.

The station 10 in accordance with the present invention includes a telephone line interface 12 coupled to one or more telephone lines 14 of a telephone operating system. In the present embodiment, the station is capable of handling four telephone lines. However, it is foreseen that more or less telephone lines could be handled.

The output of the telephone line interface 12 is operatively coupled to a 4-to-1 line multiplexer 16 which multiplexes the transmit and receive audio signals of the four telephone lines 14. Under the control of a microcontroller 18 via the Line Mux Sel line 16a, the line multiplexer 16 operatively couples one of the telephone lines to a coder-decoder (codec) 20. In the preferred embodiment, the Line Mux Sel line includes two lines to allow binary selection of one of the four telephone lines. The codec 20 provides anti-aliasing to filter out any unwanted audio noise, compresses the analog audio signal, and converts the filtered and compressed analog audio signal into a digital data signal. The codec is operatively coupled to a digital signal processor (DSP) 22. The DSP 22 analyzes the data signal output from the codec and determines if the data signal is representative of speech signals or DTMF tones. In response to detecting DTMF tones, the DSP decodes the tones and passes the information along to the microcontroller 18 which is operatively coupled thereto.

In response to speech signals, the DSP further compresses the data signal and transmits the data signal for storage to an audio memory 24 which is operatively coupled thereto. The further compression of the data signal allows even more speech data to be stored in the audio memory 24. The storage in the audio memory is used in conjunction with telephone answering device functionality. The station 10, as with any station within the non-KSU system of the present invention, is provided with telephone answering device functionality. DSPs that provide telephone answering device features, as well as the other above-mentioned functionality, are well known in the art. Suitable commercially available DSPs include the MSP58C8XX series of DSPs manufactured by Texas Instruments, Inc.

Although a separate DSP and codec may be used for each of the incoming telephone lines, a multiplexer is preferably utilized in order to reduce the cost of hardware. The use of a multiplexer allows the DSP to analyze the incoming audio signal over one telephone line at a time. The present invention enables telephone lines to automatically be placed on hold while the DSP is engaged with another telephone line.

In the preferred embodiment, the station 10 also includes a high impedance line interface 26. The input of the high impedance line interface is coupled to the telephone lines 14 of the telephone operating system in order to monitor the telephone lines without adversely affecting the phase response of any modem signals on the telephone lines.

The output of the high impedance line interface 26 is operatively coupled to a second 4-to-1 line multiplexer 28 which multiplexes the data received over the four telephone lines. Under the control of the microcontroller via a CPID Mux Sel line 28a, the second multiplexer 28 operatively couples one of the telephone lines to a calling party identification (CPID) detector 30 for detecting AC signals such as CAS tones and modulated CPID information. Similar to the Line Mux Sel line 16a, the CPID Mux Sel line 28a includes two lines to allow binary selection of one of the four lines. The microcontroller 18 is operatively coupled to the output of the CPID detector and processes the CPID information. The microcontroller is also operatively coupled to a display 32 for displaying the received and processed CPID information. In addition, the CPID information is provided by the microcontroller to a non-volatile random access memory (NVRAM) 34 which is operatively coupled thereto for storage. A keypad 36 is operatively coupled to the microprocessor which enables the user to manipulate the CPID data (e.g. scroll through stored CPID entries and delete CPID data). With regard to the CPID feature, use can be made in the present invention of the CPID apparatus and method disclosed in copending U.S. application Ser. No. 09/073,703 filed May 6, 1998 (inventor: Mark J. Karnowski) and assigned to the same assignee as the present application, the entire disclosure of which is incorporated herein by reference.

The microcontroller 18 is operatively coupled to the line interface 12 via a Ring Detect line 38. In the present embodiment the Ring Detect line includes four lines, one for each of the four telephone lines. Ring signals are detected by the microcontroller in order to alert the station when an incoming call has arrived on any of the telephone lines.

The station 10 includes a network modem 40 for handling out-of-band signaling between the stations of the non-KSU system. In the present embodiment, out-of-band signals are signals that are modulated on a carrier frequency greater than 280 kHz while base-band signals (e.g. speech) occur at frequencies between 0 kHz and 3 kHz. The frequency differences between the two bands allows for filtering such that the out-of-band signals will not interfere with the base-band signals. Thus, system-wide communication, such as an intercom function, may be accomplished over a telephone line common to other stations by modulating speech data on a carrier frequency. When the separate intercom channel is created, the intercom activity (out-of-band) will not interfere with normal telephone activity (base-band) transpiring over the common telephone line, and a dedicated intercom line is not necessary.

In the present embodiment, the network modem 40 takes command data and modulates it into a frequency shift keyed (FSK) signal data known as "on-off keyed" high frequency signal data, thereby creating an out-of-band signal similar to the intercom channel. The command data contains information so that a station will know what system functions to perform. For example, the on-off keyed signal data will notify a specific station that it is the intended station, inform the station of the type of call (e.g. transferred call), and instruct the station to seize a particular telephone line. Thus, command data is carried over a command channel while intercom data is carried over the intercom channel. In order to avoid interference between these two channels, the channels differ in carrier frequency.

The network modem 40 also demodulates the on-off keyed signal data that is received over the telephone line 14 from other stations. The network modem is operatively coupled to the microcontroller 18 which decodes the demodulated on-off keyed signals. The microcontroller interprets the decoded data and provides the appropriate control signals.

The microcontroller is also operatively coupled to the line interface 12 via a Line Status line 42. In the present embodiment the Line Status line includes four lines, one for each of the four telephone lines 14. The status of each telephone line is detected by the microcontroller in order to determine whether any of the telephone lines is in an "on-hook" or "off-hook" state.

Figure 2:
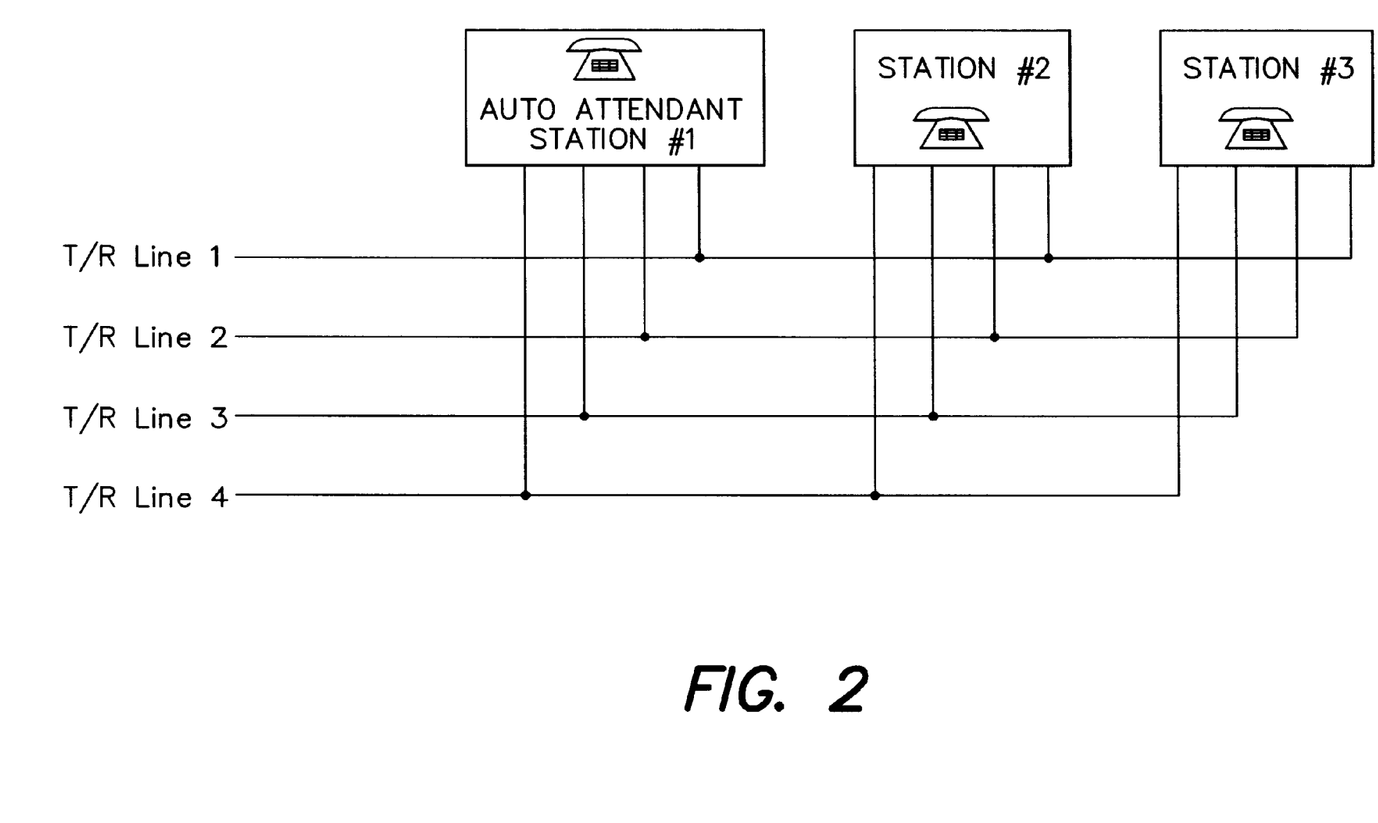
FIG. 2 is a block diagram of a non-KSU system in accordance with an embodiment of the present invention.

Referring now to FIG. 2, a block diagram of a non-KSU system in accordance with the preferred embodiment of the present invention is shown. Although any station may be set to be the auto-attendant, in the present illustration, Station #1 has been selected. As a result, Stations #2 and #3 are non-auto-attendant stations within the non-KSU system. Although FIG. 2 illustrates a total of three stations, the maximum allowable stations within the system is determined by the system designer. Each station (1, 2, 3) is connected to all of the available telephone lines (four, in this case). At a minimum, each of the stations is connected to at least one common telephone line. This allows system communication between each of the stations, as well as the intercom function and the transferring of telephone calls.

Although all of the stations (1, 2, 3) within the non-KSU system of the present invention receive ringing signals from the central office, a specific station may be selected to automatically seize a telephone line based on the central office ringing signals. That selected station is designated as the "auto-attendant". It is an advantage of the present invention that any station within the system may be set to be the auto-attendant. Since there are no physical differences between each of the stations within the system, if it is required that the designated auto-attendant station be taken out of the system, any other station may easily be set to function as the auto-attendant.

The auto-attendant station is responsible for automatically answering all incoming calls originating from the central office and for playing a message to the telephone line. For example, upon answering an incoming call, the auto-attendant can instruct the caller on how to reach another station within the non-KSU system. In order to avoid multiple stations seizing a telephone line and playing an outgoing message, only one station within the system may be set as the auto-attendant at a given time. As previously described and which is known in other non-KSU systems, in order to obtain system-wide functionality, such as an intercom function, all of the stations are generally connected to at least one common telephone line. Thus, intercom data can reach any station within the system by traveling over the common telephone line. Similarly, in the present invention, every station utilizes the common telephone line to check for the existence of a station set in auto-attendant mode, and thus, each station can make an intelligent decision as whether or not the station may be set as the auto-attendant.

In the preferred embodiment of the present invention, when a station is designated as the auto-attendant, upon detection of the ringing signals from the central office, only the auto-attendant presents an audible ring. The other stations may indicate central office ringing by a flashing LED or other indication (including audible indication), but generally the non-auto-attendant stations will emit ring sounds only in response to calls specifically directed to the particular station. For example, they will ring in response to: 1) calls that have been manually transferred from another station; 2) calls automatically transferred by the auto-attendant; or 3) an intercom request from another station. This is advantageous in that when a non-auto-attendant station rings, the user is assured that the call has in some way been specifically directed to that station. If none of the stations is designated as the auto-attendant, then every station will emit ring sounds in response to central office ringing signals.

When a call is transferred, either manually or by the auto-attendant, the transferring station notifies the intended destination station that a call is being transferred. In the preferred embodiment, the transferring station sends a message string (e.g. xfer_msg_to_station_*2 line(x)) via a command channel. Once the destination station has been notified of a transferred call, the destination station generates a transfer ring sound. It should be noted that the transferring station is not responsible for sending the destination station any ring signals. That is, once a transfer message string is received, each station determines the number of times it will ring based on their own individual ring settings.

Each station is also preferably equipped with voice mail capabilities. Although the non-auto-attendant stations do not automatically answer in response to central office ringing signals, when their voice mail feature is enabled, these stations will automatically answer after a user-defined number of transfer ring signals. This is advantageous in that when a non-auto-attendant station records a message, the user is assured that the message has in some way been specifically directed to that station.

In the preferred embodiment of the present invention, a logical scheme for distributing and storing calling party identification (CPID) information is provided. In the present invention, every station has access to all of the telephone lines. Although every station is equipped to receive CPID information transmitted over each of the telephone lines, generally the CPID information does not need to be stored at every station within the system. In the preferred embodiment, only the auto-attendant station stores all of the CPID information. Other than the auto-attendant, CPID information is only stored in a station that: 1) manually answers an incoming or transferred call; or 2) automatically answers a transferred call via that station's voice mail. That is, if the incoming call is answered at another station, the auto-attendant transmits the appropriate CPID information in addition to any information necessary to complete the call.

Alternatively, since each station can detect the CPID information, the messages may be temporarily held in each station's memory until a determination is made as to which stations should or should not ultimately store the CPID information. For example, the non-auto-attendant stations may discard the CPID information if: 1) the incoming call is transferred to a station other than itself; 2) a predetermined period of time has elapsed; 3) the incoming call is terminated prior to its transfer; or 4) the incoming call is answered at a station other than itself. Thus, in either embodiment, a user can keep a record of calls that were directed to or answered at a particular station as opposed to having every station store CPID information for every call received by the system.

Figure 3:
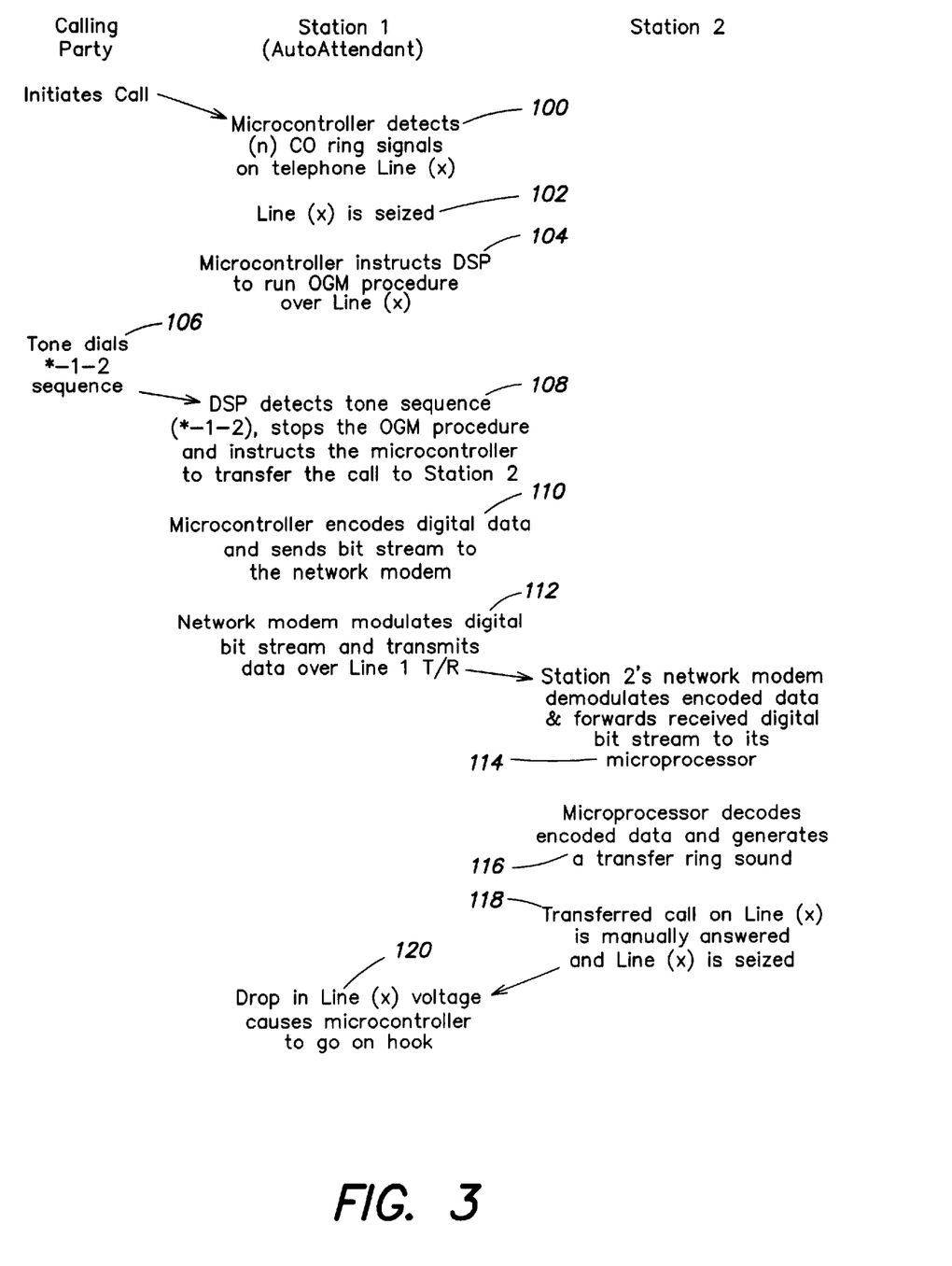
FIG. 3 is a flow diagram showing an embodiment of the operation of the message transfer feature of the present invention.

Referring now to FIG. 3, a flow diagram showing the operation of the message transfer feature of the present invention is shown. For simplicity, only two stations are represented and Station #1 is designated to act as the auto-attendant. Upon receiving an incoming call, Station #1 detects ring signals generated by the central office over one of the telephone lines (Step 100). Station #1 seizes the telephone line (Step 102) and proceeds to play an outgoing message (OGM) to the telephone line (Step 104). The OGM may be a pre-programmed message or a message recorded by the system user. Generally the OGM will contain a series of prompts which instruct the user how to direct his call (e.g. "Please press *2 to reach the Marketing department, press *3 to reach the Engineering department,."). The caller then directs his call accordingly by inputting one or more DTMF tones (Step 106). When Station #1 detects valid tones (e.g. *2), Station #1 stops playing the OGM to the telephone line and prepares to direct the call to the appropriate station (e.g. Station #2) (Step 108). The microcontroller encodes digital data containing instructions on handling the call and transmits the data as a digital bit stream to the network modem (Step 110). The network modem modulates the digital bit stream onto a commonly shared telephone line (e.g. Line 1) (Step 112). The digital bit stream contains information to specifically notify Station #2 to prepare to receive a transferred call and on which telephone line the call resides. The network modem of Station #2 demodulates the digital bit stream (Step 114) and sends the demodulated data to the microprocessor. The microprocessor of Station #2 decodes the digital data and generates a special ring signal indicating that a call is being transferred to the station (Step 116). If the transferred call is manually answered, Station #2 seizes the telephone line on which the transferred call resides (Step 118). Responsive to the drop in DC voltage when Station #2 seizes the telephone line, Station #1 will go on-hook (Step 120).

Figure 4:
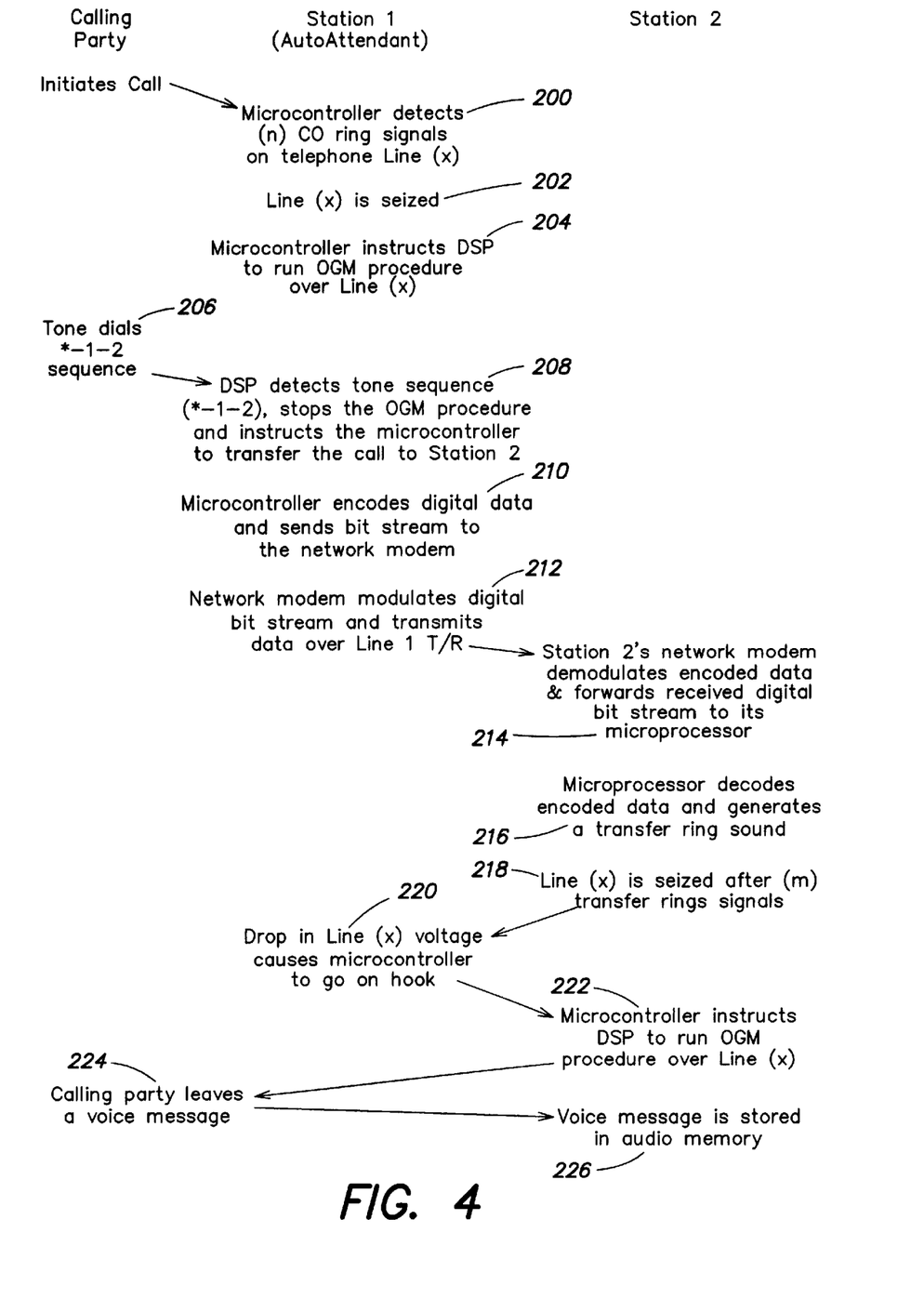
FIG. 4 is a flow diagram showing another embodiment of the operation of the message transfer feature of the present invention.

Referring now to FIG. 4, a flow diagram showing an alternative embodiment of the operation of the message transfer feature of the present invention is shown. Steps 200–216 are identical to Steps 100–116 of FIG. 4. Following Step 216, if no one is present to answer the call and the voice mail function of Station #2 is enabled, after a predetermined number of ring signals, Station #2 will seize the telephone line on which the transferred call resides (Step 218). Responsive to the drop in DC voltage when Station #2 seizes the telephone line, Station #1 goes on-hook (Step 220). Therefore, regardless of whether the transferred call is manually or automatically answered, Station #1 will wait until Station #2 goes off-hook before dropping the telephone line and Station #1 (the auto-attendant) does not need to have any prior knowledge of the ring-count setting for each individual station. After Station #2 seizes the telephone line of the transferred call, Station #2 plays an outgoing message to the telephone line and allows the caller to record a message at Station #2 (Step 222). As the calling party is leaving a voice message (Step 224), the recorded message is compressed and stored in the audio memory of Station #2 (Step 226).

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A non-key service unit (non-KSU) telephone apparatus for use with a plurality of telephone lines, comprising:

a line interface having an input operatively coupled to the plurality of telephone lines and a plurality of outputs;

a microcontroller operatively coupled to the line interface;

a first multiplexer operatively coupled to the microcontroller and at least a portion of the plurality of outputs of the line interface, the first multiplexer multiplexing transmit and receive audio signals for the plurality of telephone lines;

a high impedance line interference operatively coupled to the plurality of telephone lines, the high impedance line interface monitoring each of the plurality of telephone lines without adversely affecting a phase response of a modem signal on one of the plurality of telephone lines; and a second multiplexer operatively coupled to an output of the high impedance line interface and the microcontroller, the second multiplexer multiplexing data received over the plurality of telephone lines and provided by the high impedance line interface;

a coder/decoder coupled to the first multiplexer, the microcontroller instructing the first multiplexer to couple one of the plurality of telephone lines to the coder/decoder, the coder/decoder receiving a telephone signal from the one telephone line, filtering and compressing the telephone signal, and converting the filtered compressed telephone signal to a digital signal; and a digital signal processor (DSP) operatively coupled to the coder/decoder and the microcontroller, the DSP analyzing the digital signal provided by the coder/decoder and determining whether the digital signal is a speech signal or DTMF tones, wherein if the DSP determines that the digital signal is DTMF tones, the DSP decodes the DTMF tones and provides the decoded DTMF tones to the microcontroller, and wherein if the DSP determines the digital signal is a speech signal, the DSP compresses the digital signal and stores the compressed digital signal in a memory.

2. The non-key service unit (non-KSU) telephone apparatus according to claim 1 further comprising:

a calling party identification detector (CPID) operatively coupled to the output of the second multiplexer and the microcontroller, the CPID detecting calling party identification information transmitted over the plurality of telephone lines and processing same.

3. The non-key service unit (non-KSU) telephone apparatus according to claim 2 further comprising:

a display operatively coupled to the microprocessor, the display displaying the received and processed CPID information.

4. The non-key service unit (non-KSU) telephone apparatus according to claim 2 further comprising:

a keypad operatively coupled to the microprocessor for manipulating the CPID data.

5. The non-key service unit (non-KSU) telephone apparatus according to claim 2 further comprising:

a non-volatile random access memory (NVRAM) coupled to the microcontroller for storage of the CPID data.

6. The non-key service unit (non-KSU) telephone apparatus according to claim 1 wherein the microcontroller is coupled to the first multiplexer via a line mux sel line which includes at least two lines to allow binary selection of one of the plurality of telephone lines.

7. The non-key service unit (non-KSU) telephone apparatus according to claim 1 wherein the microcontroller is coupled to the line interface via a ring detect line and a line status line, the ring detect line including a plurality of lines corresponding to the plurality of telephone lines, the line status line including a plurality of lines corresponding to the plurality of telephone lines.

8. The non-key service unit (non-KSU) telephone apparatus according to claim 7 wherein the microcontroller detects ring signals on the plurality of telephone lines via the ring detect line to determine when an incoming call has arrived on any of the plurality of telephone lines, and wherein the microcontroller detects whether any of the plurality of telephone lines is on-hook or off-hook via the line status line.

9. The non-key service unit (non-KSU) telephone apparatus according to claim 1 further comprising:

an audio memory coupled to the DSP for storage of telephone information in conjunction with telephone answering device functionally.

10. The non-key service unit (non-KSU) telephone apparatus according to claim 1 further comprising:

a network modem operatively coupled to the microcontroller and the line interface.

11. The non-key service unit (non-KSU) telephone apparatus according to claim 10 wherein the network modem enables intercom communication between a plurality of stations over at least one of the plurality of telephone lines.

12. A message transfer method for a telephone system having a plurality of telephone lines and a plurality of telephone stations, one of which is designated as an auto-attendant station, comprising the steps of:

a) receiving an incoming call from a caller on a first telephone line;

b) detecting a ring signal over the first telephone line at the telephone station that was designated to function as the auto-attendant station;

c) seizing the first telephone line via the auto-attendant station;

d) playing an outgoing message via the auto-attendant station on the first telephone line;

e) monitoring a response to the outgoing message by a caller on the first telephone line, the response corresponding to a desired one of the plurality of telephone stations that the caller would like the incoming call transferred to;

f) directing the incoming call via the auto-attendant station to a desired one of the plurality of telephone stations in accordance with the caller's response;

g) encoding digital data which includes instructions on handling the incoming telephone call;

h) transmitting the digital data as a digital bit stream;

i) modulating the digital bit stream onto a telephone line shared commonly between at least the auto-attendant station and the desired telephone station, the digital bit stream containing information to specifically notify the desired one of the plurality of telephone stations to prepare to receive a transferred call and on which telephone line of the plurality of telephone lines the incoming call resides;

j) demodulating the modulated digital bit stream at the desired one of the plurality of telephone stations;

k) decoding the demodulated digital bit stream; and l) generating a specific ring signal at the desired telephone station to indicate that a call is being transferred, wherein if the transferred call is manually answered, the desired telephone station seizes the telephone line on which the transferred call resides, and wherein in response to a drop in DC voltage when the desired telephone station seizes the telephone line, placing the auto-attendant station in an on-hook mode.

13. The message transfer method for a telephone system according to claim 12 wherein if the transferred call is not manually answered and a voice mail function of the desired telephone station is activated, after a predetermined number of ring signals at the desired telephone station, the desired telephone station seizes the telephone line on which the transferred call resides, wherein in response to a drop in DC voltage when the desired telephone station seizes the telephone line, the auto-attendant station is placed in an on-hook mode, and wherein after the desired telephone station seizes the telephone line of the transferred call, the desired station plays an outgoing message to the telephone line and permits the caller to record a message at the desired telephone station, the recorded message is compressed and stored in a memory of the desired telephone station.

* * * * *